United States Patent [19]

Ingemarsson

[11] 3,801,431

[45] Apr. 2, 1974

[54] METHOD AND APPARATUS FOR CONTINUOUS PRETREATMENT OF WOODEN CHIPS

[76] Inventor: Gosta Ingemar Ingemarsson, 9, Dyrkebolsgatan, Karlstad, Sweden

[22] Filed: Aug. 27, 1971

[21] Appl. No.: 175,433

[30] Foreign Application Priority Data
Aug. 31, 1970 Sweden............................ 11826/70

[52] U.S. Cl........................ 162/19, 162/46, 162/68, 162/237, 162/241
[51] Int. Cl............................. D21c 3/26, D21c 7/10
[58] Field of Search............. 162/19, 68, 46, 17, 25, 162/242, 250, 184, 246, 241, 237; 34/32, 37, 73, 78, 168, 169, 177

[56] References Cited
UNITED STATES PATENTS

| | | | |
|---|---|---|---|
| 3,215,587 | 11/1965 | Guerrieri | 162/19 |
| 1,457,326 | 6/1923 | Tompkins | 162/46 |
| 3,007,839 | 11/1961 | Richter | 162/17 |
| 3,530,034 | 9/1970 | Erickson | 162/68 X |
| 2,265,622 | 12/1941 | Basler | 162/68 X |
| 3,619,348 | 11/1971 | Asplund | 162/19 |

*Primary Examiner*—S. Leon Bashore
*Assistant Examiner*—Richard V. Fisher
*Attorney, Agent, or Firm*—Brumbaugh, Graves, Donohue & Raymond

[57] ABSTRACT

Wooden chips are heated by a steam heating device in a closed pressure vessel to remove water and air therefrom and are fed to at least one additional heated closed pressure vessel. A portion of the effluent from each pressure vessel is fed to the next vessel to supply heat to that vessel. The condensate-steam mixture from the heating pipe in the first vessel is collected and the steam portion of the condensate-steam mixture is combined with the first vessel's effluent in the heating pipe of the second vessel. This is repeated in all but the last vessel. The steam portion of the condensate-steam mixture in the last vessel is added directly to the interior of the last vessel. Turpentine is recovered from the effluent from the last vessel. The apparatus includes a series of individually enclosed pressure vessels connected in series to one another at the wooden chip outlet of the first and the chip inlet of the next following vessel. All vessels are maintained at different pressures, preferably with the highest pressure in the first vessel and the lowest in the last so that the amount of water removed from the chips in each vessel is equal to that produced in the other vessels.

12 Claims, 1 Drawing Figure

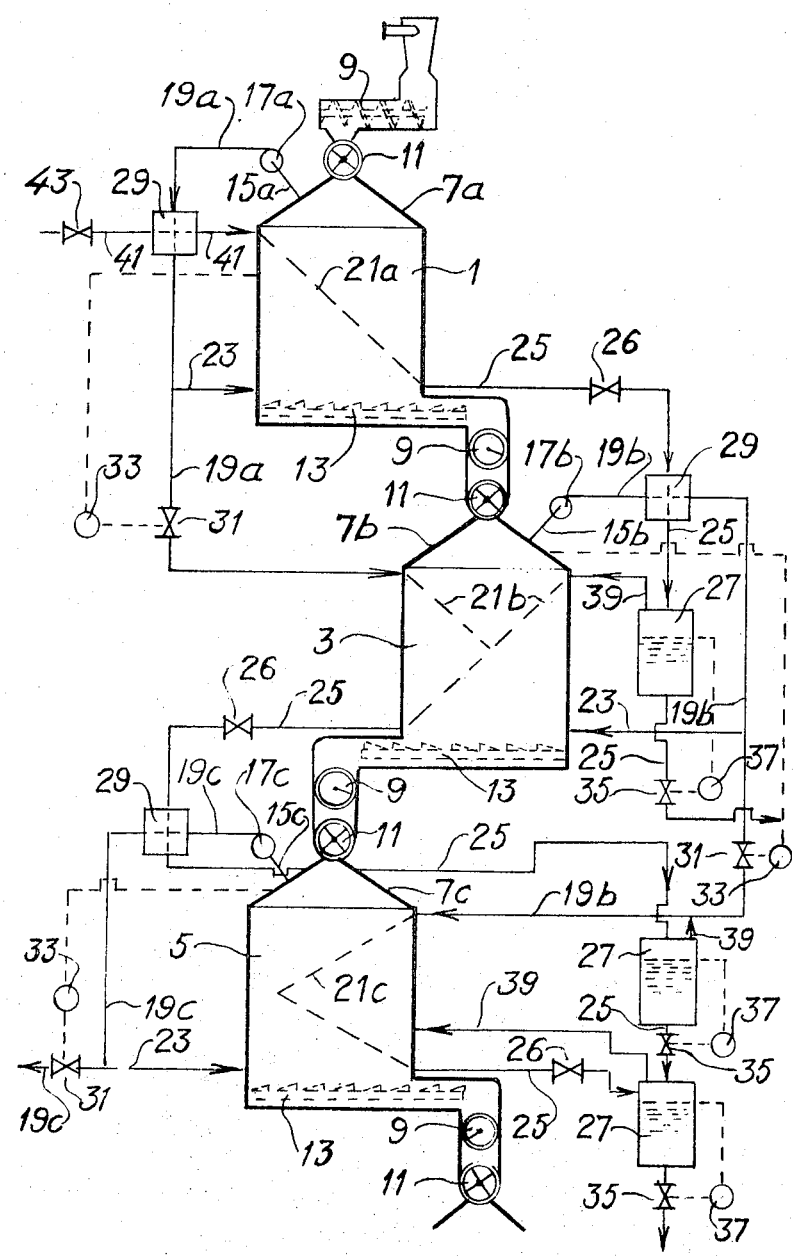

METHOD AND APPARATUS FOR CONTINUOUS PRETREATMENT OF WOODEN CHIPS

The present invention is a method for the pretreatment of wooden chips prior to their being digested to produce pulp, and an apparatus for performing this method.

The continuous pulp digesters used today were developed during a period when chips having a uniform and low solids content were fed to the digester. These chips were often obtained from floated timber and had a generally homogeneous quality. The prior art usually deaerated the chips by steaming in a steaming vessel, and thereafter impregnated them with cooking liquor in a liquid diffusion process at low temperature in the bottom part of the steaming vessel, in a separate pressure-impregnating vessel, or in the top part of the digester.

Even though the low solids content chips had a fully homogeneous nature, the above-mentioned known methods had a number of essential deficiencies. The steaming of the chips to deaerate them normally reduced the average low solids content even further due to the condensation of a film of liquid on the surface of the chips. The generally high liquid content of the steamed, deaerated chips had an undesirable diluting effect on the chemicals added in the later digestion step. The chemicals necessary for the digestion could not therefore be supplied to the steamed chips by absorption but had to be supplied by liquid diffusion into the chips at relatively low temperatures during the major part of the digestion step. The use of this liquid phase diffusion process is of course much slower than digestion by absorption using a steam phase process. In addition, a hydrolysis reaction occurs in the liquid layer on the chips, when it is raised to 100°C. or greater, and inside the wet chips during prolonged steaming. This reaction is accelerated by the presence of acids in the wood and leads to deterioration of the pulp.

The above-mentioned disadvantages of the known procedures is becoming manifest due to the fact that today pulp mills must generally use chips having a widely varying solids content and quality. Attempts have been made to solve these problems but no solution has been found heretofore that is practical. One such example of an attempt to solve these problems by pretreating wooden chips before impregnation to yield a homogeneous chip having a high solids content and, hence, a low water content, is contained in U.S. Pat. No. 3,215,587.

The prior art used a liquid diffusion digestion process after the wooden chips had been deaerated by steaming. Such a digestion process was needed in view of the low solids and high water content of the steamed chips, but it is less desirable than steam digestion for a number of reasons. Digestion in the steam phase results in a 20 to 25 percent steam saving as compared with digestion in the liquid phase, and it takes place considerably faster thereby increasing the digester capacity. Digestion in the steam phase and a more homogeneous impregnation of chips with chemicals is estimated to result in a savings in chemicals of approximately 40 percent. Digestion in the steam phase also involves an approximately 25 percent higher wood/liquid ratio during digestion which, in combination with the smaller consumption of chemicals, produces less load on parts of the chemicals recovery equipment, namely, the evaporation plant, causticizing plant and lime sludge reburning plant.

In order to steam digest deaerated wooden chips, however, the solids content must be higher than the solids content of wooden chips subjected to the prior art steam deaeration procedures. This generally entails removal of water vapor from the chips during deaeration.

Chips with lumina completely filled with water generally have a solids content of about 18 percent. They contain approximately 4.5 kg. of water per kg. of dry wood with 0.3 kg. of this water being bound as swelling water in the fiber wall, 1.8 kg. being in the lumina, and the remaining 2.4 kg. being surface water. Wood raw material can vary in solids content from between about 30 to 65 percent and would contain from about 2.3 kg. to 0.5 kg. of water per kg. of dry wood on this basis. Raw wood material with a 40 percent solids content has a water content of about 1.5 kg. A 50 percent solids wood contains about 1.0 kg. of water. Assuming that the chips can be impregnated with cooking liquor to a solids content of 18%, the following quantities of liquid per kg. of dry wood will be absorbed at different wood solids contents:

| Wood Solids Content (%) | Kg. Cooking Liquid/Kg. Dry Wood |
| --- | --- |
| 30 | 2.2 |
| 40 | 3.0 |
| 50 | 3.5 |
| 60 | 3.8 |
| 65 | 4.0 |

It is evident that the low solids content must be avoided due to dilution of the added cooking liquid by the liquid content of the low solids chips. A solids content of from about 55 to 65 percent has less effect upon the chemical concentration of the impregnated chips than does a lower solids content chip.

If incoming wood chips have a 50 percent solids content, the above table shows that 0.5 kg. of water per kg. of wood must be evaporated to yield a chips solids content of 65 percent. At a pulp yield of 45 percent this means that approximately 1,100 kg. of water per ton of pulp must be removed by evaporation. In order to accomplish this evaporation, approximately 610 Mcal. would be required in a single-stage evaporation. The total steam consumption for the digestion process is approximately 500 Mcal./ton of pulp. It is obvious that a single-stage treatment of the pulp before digestion is not a realistic solution to the problem.

SUMMARY OF THE INVENTION

An object of the invention is to remedy the deficiencies of conventional methods and apparatus noted above and, in particular, to provide a method and apparatus facilitating the economical production of a high solids content wood chip having little entrapped air.

The applicant has found that the pretreatment of wood chips is best carried out in two or preferably more treatment stages in a number of heated pressure vessels which are individually closed. The heat is supplied by convection and radiation from steam-filled heating devices. The chips are fed continuously from one treatment stage to the other while the vapor from the evaporated chip water in one treatment stage is heated in a heat exchanger and a portion of the effluent from one stage is drawn off from the closed pressure system and used at a lower pressure in the next following stage to supply heat. Another portion is recycled before pressure reduction to cause agitation of the chips in the previous stage. The result is a high-solids content wood chip which can be subsequently digested in the steam phase.

The steam consumption in the applicant's process is in inverse proportion to the number of stages used although some losses occur when many steps are utilized. A three-stage system is preferred. The following table gives the relationship between steam consumption and the number of stages:

| Kg. Steam Consumption for Evaporation of 1 Kg. Water | Numer of Stages |
| --- | --- |
| 1.0 | 1 |
| 0.52 | 2 |
| 0.37 | 3 |
| 0.30 | 4 |
| 0.25 | 5 |
| 0.20 | 6 |

The process comprises feeding wooden chips into a first closed pressure vessel which is heated to a temperature sufficiently high to expel from the chips an essential quantity of the water content of the chips as vapor along with air. The chips are thereafter fed to at least one additional heated closed pressure vessel to remove additional vapor effluent. The pressure vessels are connected in series to one another and are individually closed and maintainable at separate pressures. Generally, the first vessel will have the highest pressure with each succeeding vessel having a lower pressure. A portion of the effluent from each pressure vessel is fed through pressure-regulating valves which can draw off a portion of the vapor to give a lower pressure in the next following pressure vessel. A portion of the effluent can be removed for recycling to the previous vessel to agitate the chips in that vessel. The steam lines through the heating devices in all but the last vessel after exiting from the vessel contain condensate as well as steam and pass through a heat exchanger along with the effluent line from the next following vessel. Condensate is collected after each stage. Turpentine can be recovered from the last stage effluent. This allows for increased recovery and purity of turpentine by-products over the prior art since the turpentine is removed prior to digestion of the chips. In prior art processes it was often present in the cooking liquid and would react with the digesting chemicals.

The wooden chips to be treated are split up essentially along the direction of the fibers in the wood to a size of about 25×10×5 millimeters. The dimensions of the pores in the wood vary but the average diameter is approximately 0.01 millimeter or $3.937 \times 10^{-4}$ inches. The volume of the pores in the wood is about 2 liters in 1 kg. of wood calculated on a bone-dry basis. In the wet chips to be treated, the pores are, of course, partially water-filled.

The retention time of the chips in each stage is calculated at about 15 minutes. The temperature of the steam both in the heat exchanger and the pressure vessels corresponds to the temperature of saturated steam at the pressures prevailing in the apparatus. The pressure in one stage is about the same pressure as that in the heat exchanger in the following stage with the pressure difference between the stages being dependent upon the heat exchanger areas. Optimum evaporation efficiency is attained if the heat exchanger area is essentially the same in all stages with the exception of the stage at the chip inlet since the heat transfer coefficient at this stage will be somewhat lower due to more air being present in the untreated chips. The heat exchanger used in this stage should therefore be somewhat larger than in any of the other stages. The pressure that will be maintained in each of the vessels is such that the same quantity of vapor is produced in all stages. It has been found that vessel pressures of 7 kg./cm$^2$, 3 kg./cm$^2$ and 0.5 kg./cm$^2$, respectively, give good results in a three-stage apparatus. The steam pressure to each of the vessels mentioned above would be 10 kg./cm$^2$, 7 kg./cm$^2$ and 3 kg./cm$^2$, respectively.

Tubular heat exchangers when used with steam generate the large quantities of heat which are required in this process. The requirement for the chips to be free from air is accomplished by locating the heat exchangers in an enclosed space in which the atmosphere consists of vapor from evaporated chip water mixed with air that has accompanied the chips into the space. The desired pressure is of course maintained by discharge of vapor whereby with a normal incoming chip solids content the air content is reduced to a negligible amount.

For greatest steam economy it is essential that discharged water vapor and air from the chips in each treatment stage be approximately as great in heat content as condensed steam in the heat exchanger tubes in the treatment stage plus leakage vapors supplied from the previous stage through the infeed devices. The optimum thermal distribution of the treatment between the stages is obtained partly by dimensioning the heat exchanger surface area in the pressure vessels and partly by adjustment of the vapor pressure regulators on the different pressure vessels.

BRIEF DESCRIPTION OF THE DRAWING

An understanding of other aspects of the invention can be gained from a consideration of the following detailed description of the preferred embodiment thereof, in conjunction with the appended drawing, wherein the sole FIGURE is a schematic view of the preferred embodiment of the apparatus constructed in accordance with the invention.

DESCRIPTION OF THE PREFERRED EMBODIMENT

The FIGURE which forms a part of this specification shows a preferred embodiment of a chip treatment device. It comprises three closed pressure vessels 1, 3 and 5 arranged in series having conical top parts 7a, 7b and 7c, to which are connected infeed devices for wooden chips, each infeed device consisting of a screw conveyor 9 and a rotary vane feeder 11. At the bottom of each pressure vessel 1, 3 and 5 there is a stoker system 13 for conveying wood chips to the screw conveyor 9 in the infeed device for the following pressure vessel. The conical top parts 7a, 7b and 7c of the pressure vessels 1, 3 and 5 are provided with exhaust devices for vapor-air mixture, comprising pipe connections 15a, 15b and 15c connected to the suction side of fans 17a, 17b and 17c. The pressure sides of the fans 17a and 17b for the first two pressure vessels 1 and 3 are connected to pipe lines 19a and 19b, which in their turn are connected to heating devices 21b and 21c (indicated in the FIGURE by dash lines) incorporated in the following pressure vessels 3 and 5. The pressure side of fan 17c for the last pressure vessel 5 is connected to a pipe line 19c, which in its turn is connected to devices (not shown) for extraction of turpentine and recovery of heat. The heating devices 21a, 21b and 21c are formed of steam piping or other heat transmitting elements of, e.g., lamella type, in which steam is allowed to condense. From the pipe lines 19a, 19b and 19c there are branch pipes 23 for return of vapor-air mixture to the bottom of the pressure vessels. Condensate pipe lines 25 with shut-off valves 26 are connected to the heating devices 21a, 21b and 21c at the bottom of each pressure vessel 1, 3 and 5 and lead to condensate tanks 27. At each pressure vessel 1, 3 and 5 there is a heat exchanger 29, through which vapor-air mixture is allowed to pass. In each pipe line 19a, 19b and 19c there are regulating valves 31, which are controlled by pressure regulators 33. Downstream from each condensate tank 27 there are regulating valves 35, which are controlled by level regulators 37. From each condensate tank 27 there are pipe lines 39, through which steam from the condensate is supplied to the heating devices 21, although at pressure vessel 5 the steam from the last condensate tank 27 is supplied directly to the chip treatment space. A steam line 41 for live steam, in which there is a shut-off valve 43, is connected to the heating device 21a of the pressure vessel 1.

The device operates in the following way: Wood chips are supplied to the first pressure vessel 1 through the screw conveyor 9 and the rotary vane feeder 11. The level of chips in the pressure vessel 1 is indicated by instruments (not shown in the FIGURE), which control the infeed. Steam (e.g., at 10 kg./cm$^2$ pressure) is supplied to the heating devices 21a through the pipe line 41. The heating devices are located and dimensioned to permit a uniform flow of wood chips down through the pressure vessel 1 and a maximum heat transfer evenly distributed to the chips in the pressure vessel 1. From the heating devices 21 heat transfer takes place by radiation and convection to the wet chips, whereby the water evaporates and air is released from them. The fan 17a draws the vapor-air mixture from the top of the pressure vessel 1 and blows a portion of this through the branch pipe 23 in through a system of nozzles at the bottom of the pressure vessel. When the vapor-air mixture is forced up through the wood chips in the pressure vessel 1 it makes them free flowing, and the heat transfer is aided by the turbulence thus obtained in the chip volume and by convection from the heat exchanger surfaces to the vapor-air mixture.

The vapor-air mixture that is drawn off from the top of the first pressure vessel 1 is allowed to pass through a heat exchanger 29, in which it is superheated with the aid of the steam in the pipe line 41, which is simultaneously saturated before its entry into the heating device 21a. By this means total recondensation on the chips is avoided and a better heat transfer in the heating devices 21a is obtained. A regulating valve 31 in the pipe line 19a blows off sufficient vapor-air mixture from the first pressure vessel 1 to the heating devices 21b in the second pressure vessel 3 for a desired vapor pressure (e.g. 7 kg./cm$^2$) to be maintained in the first pressure vessel 1 with the aid of the pressure regulator 33, which controls the regulating valve 31. Condensate formed in the heating devices 21a is passed through the condensate pipe line 25 to the condensate tank 27.

Discharge of treated chips takes place by a stoker system 13, which is designed to provide an even outfeed of chips from the whole of the bottom area of the first pressure vessel 1. The stoker system 13 conveys the chips to the infeed device (screw conveyor 9 and rotary vane feeder 11) at the second pressure vessel, into which they are fed.

In the second pressure vessel 3 the treatment of the chips is repeated for expelling additional air and water in the same way as in the first pressure vessel 1. Heating in the second treatment vessel 3 takes place partly with steam from condensate formed in the heating devices 21a of the first pressure vessel and supplied to the heating devices 21b of the second pressure vessel through pipe line 39, and partly with a superheated vapor-air mixture from the first pressure vessel 1, which is supplied through the pipe line 19a to the heating devices 21b.

The chips are discharged from the second pressure vessel 3 in the same way as from the first pressure vessel 1 and are fed into the third pressure vessel 5. The speed of the rotary vane feeders 11 in the infeed and outfeed devices at the second and third pressure vessels 3 and 5 is controlled so that the correct chip quantity is discharged from the third and last pressure vessel 5 to a following continuous impregnation and digestion process. Heating in the third pressure vessel 5 takes place partly with steam from condensate formed in the heating devices 21b of the second pressure vessel 3, partly with superheated vapor-air mixture from the second pressure vessel 3. Steam from the third condensate vessel 27 is supplied directly to the chip treatment space in the third pressure vessel 5. Vapor-air mixture blown from the third pressure vessel 5 is heat exchanged with water to condense the mixture and produce hot water. Turpentine will be present in the condensate. Turpentine in the condensate from the last two condensate tanks 27 can be extracted by a simple distillation process and the heat content of the condensate is utilized suitably for the production of hot water. Condensate from the first condensate tank 27 is pumped to the boiler house to be used as feed water. Wood chips are discharged from the third pressure vessel 5 and conveyed in a closed system to subsequent impregnation with cooking chemicals. The solid content of the finished chips is measured continuously and the pressure of the live steam supplied to the heating devices 21A in the first pressure vessel 1 is controlled by a valve 43 to obtain the desired solid content of the wood chips.

A person of ordinary skill in the art upon reading the foregoing specification will be aware of modifications which may be made. The foregoing is hence intended to be merely illustrative of the invention and not limiting thereof. The invention is defined in the claims appended hereto.

I claim:

1. In a method for continuous pretreatment of wooden chips in preparation for the production of pulp by digestion, wherein the chips are heated by conveying them along hot surfaces within a closed pressure system to such a high temperature that a substantial quantity of the water content of the chips together with air is expelled from the chips in the form of a vapor-air mixture, a first portion of the vapor-air mixture being drawn off from the pressure system and a second portion of the vapor-air mixture being caused to flow between the pieces of chips in a direction opposite to the direction of conveyance of the chips in the pressure system, the improvement comprising the steps of
   a. providing first and second separate pressure vessels for holding the chips, each of the vessels having heating pipes within the vessel providing heated surfaces for heating the chips to evolve a vapor-air mixture therefrom;
   b. connecting the first vessel to the second vessel for conducting chips from the first vessel to the second while affording maintenance of different pressures in the respective vessels;
   c. conveying the chips into and through the first vessel and from the first vessel into and through the second vessel;
   d. supplying steam under a pressure substantially above atmospheric pressure to the heating pipes of the first vessel to heat said surfaces and evolve a first quantity of a vapor-air mixture from the chips in the first vessel;
   e. expelling the vapor-air mixture from the first vessel and conducting a first portion thereof to the heating pipes of the second vessel to heat said surfaces and thereby the chips to evolve a quantity of vapor-air mixture therefrom in the second vessel and conducting a second portion thereof back into the first vessel for flow through the chips in a direction opposite to the direction of conveyance; and
   f. maintaining the pressures in the respective vessels so that substantially equal portions of the liquid content of the chips are evolved in each vessel.

2. A method according to claim 1 comprising the step of maintaining the pressures in successive vessels in the direction of conveyance of the chips progressively lower.

3. A method according to claim 1 comprising the step of superheating said first portion of the vapor-air mixture that is expelled from the chips in the first vessel prior to conducting it into the heating pipes of the second vessel.

4. A method according to claim 1 comprising the steps of drawing off the vapor-air mixture expelled from the chips in the second vessel and condensing it for extraction of turpentine.

5. A method according to claim 1 and further comprising the steps of providing a third pressure vessel having heating pipes therewithin, the third vessel being connected in series to the second vessel for conduction of chips from the second vessel into and through the third vessel while affording maintenance of different pressures in the vessels, supplying a portion of the vapor-air mixture evolved from the chips in the second vessel to the heating pipes of the third vessel, and maintaining the pressure in the third vessel at a level to provide evolution of a quantity of vapor-air mixture from the chips in the third vessel substantially equal to the quantities evolved in each of the first and second vessels.

6. A method according to claim 5 in which the pressures in the first, second and third vessels are about 7 kg./cm$^2$, 3 kg./cm$^2$, and 0.5 kg./cm$^2$, respectively.

7. A method according to claim 6 in which the pressure of the steam supplied to the heating pipes of the first vessel is about 10 kg./cm$^2$ and the pressures of the vapor-air mixtures supplied to the second and third vessels are about 7 kg./cm$^2$ and 3 kg./cm$^2$, respectively.

8. Apparatus for the pretreatment of wooden chips in preparation for the production of pulp by digestion of the chips comprising:
   a. first and second separate pressure vessels;
   b. means connecting the first vessel to the second vessel for conduction of chips from the first vessel to the second while affording maintenance of different pressures in the two vessels;
   c. means for conveying chips from the first vessel into the second vessel;
   d. heating pipes in each of the vessels defining heated surfaces for heating the chips in each of the vessels;
   e. means for supplying steam from a source thereof to the heating pipes of the first vessel to heat the chips therein and evolve a first quantity of a vapor-air mixture from the chips in the first vessel;
   f. means including an effluent pipe for withdrawing the vapor-air mixture evolved from the chips in the first vessel and conducting a first portion thereof to the heating pipes of the second vessel and a second portion thereof back into the first vessel for flow through the chips therein in a direction opposite to the direction of conveyance of the chips; and
   g. means for maintaining the pressures in the respective vessels at levels such that a quantity of a vapor-air mixture is evolved from the chips in the second vessel substantially equal to said first quantity evolved in the first vessel.

9. Apparatus as claimed in claim 8 wherein the means to convey chips through each vessel and into the next vessel includes a feeding device that removes chips from a respective vessel and feeds the chips to the next following vessel.

10. An apparatus as claimed in claim 8 and further comprising a condensate line connected to and leading from the heating pipes of the first vessel and heat exchange means connected to the condensate line of the first vessel and to the effluent pipe of the second vessel for exchange of heat between the condensate from the heating pipes of the first vessel and the vapor-air effluent from the second vessel.

11. An apparatus as claimed in claim 8 comprising means for maintaining the pressure in the second vessel lower than the pressure in the first vessel.

12. An apparatus as claimed in claim 8 comprising a third separate pressure vessel, means connecting the third vessel to the second vessel for conduction of chips from the second vessel to the third vessel while affording maintenance of different pressures therein, means for conveying chips from the second vessel to the third vessel, heating pipes in the third vessel defining heated surfaces for heating the chips therein, means for withdrawing the vapor-air mixture evolved from the chips in the second vessel and conducting a first portion thereof to the heating pipes of the third vessel and a second portion thereof back into the second vessel for flow through the chips therein in a direction opposite to the direction of conveyance of the chips through the second vessel, and means for maintaining the pressure in the third vessel at a level such that a quantity of vapor-air mixture is evolved from the chips in the third vessel that is substantially equal to the quantities evolved, respectively, in the first and second vessels.

* * * * *